United States Patent
Hudak

(10) Patent No.: US 6,177,516 B1
(45) Date of Patent: Jan. 23, 2001

(54) ADHESIVES AND COMPOSITE STRUCTURES FORMED THEREWITH

(75) Inventor: Stephen J. Hudak, Cary, NC (US)

(73) Assignee: Equistar Chemincals, LP, Houston, TX (US)

(*) Notice: Under 35 U.S.C. 154(b), the term of this patent shall be extended for 0 days.

(21) Appl. No.: 09/407,457

(22) Filed: Sep. 28, 1999

(51) Int. Cl.⁷ .................................................. C08G 63/48
(52) U.S. Cl. .............................................................. 525/71
(58) Field of Search ................................................ 525/71

(56) References Cited

U.S. PATENT DOCUMENTS

| | | | |
|---|---|---|---|
| 4,370,186 | 1/1983 | Blandin et al. | 156/203 |
| 4,824,736 | 4/1989 | Ehrig et al. | 156/203 |
| 5,045,401 | 9/1991 | Tabor et al. | 428/516 |
| 5,066,542 | 11/1991 | Tabor et al. | 428/461 |
| 5,246,783 | 9/1993 | Spenadel et al. | 428/461 |
| 5,534,472 | 7/1996 | Winslow et al. | 502/116 |

OTHER PUBLICATIONS

Shroff, R. and Mavridis H.: "New Measures of Polydispersity from Rheological Data on Polymer Melts," *J. Applied Polymer Science*, vol. 57, pp. 1605–1626 (1995).

Mirabella, F., et al.: "Morphological Explanation of the Extraordinary Fracture Toughness of Linear Low Density Polyethylene," *J. Polymer Science: Part B: Polymer Physics*, vol. 26, No. 9, pp 1995–2005 (1988).

*Primary Examiner*—Terressa M. Boykin
(74) *Attorney, Agent, or Firm*—Shao Guo

(57) ABSTRACT

Improved adhesives useful for the manufacture of composite structures by lamination, extrusion and coextrusion processes are provided. The compositions of the invention utilize ethylene copolymers having a network structure and exhibiting unique melt elasticity characteristics in combination with modified polyolefins containing acid or acid derivative functionality and, optionally, elastomeric polymers. Composite structures wherein the adhesives are adhered to one or more substrates and, particularly composite structures comprising metal or barrier resin layers with one or a plurality of crosslinked or uncrosslinked polyethylene resin layers, are also described.

35 Claims, No Drawings

ADHESIVES AND COMPOSITE STRUCTURES FORMED THEREWITH

BACKGROUND OF THE INVENTION

1. Field of the Invention

This invention relates to improved adhesives containing an ethylene copolymer resin having a network structure, a modified polyolefin and, optionally, an elastomeric homopolymer or copolymer. More particularly, the invention relates to extrudable adhesive compositions having acid or acid derivative functionality useful as tie-layer resins for multi-layer constructions, such as films, tubes, blow molded articles and sheets and especially for polyolefin/metal composite pressure pipe.

2. Description of the Prior Art

The use of tie-layer adhesives to improve adhesion between polyolefins, such as polyethylene (PE) and polypropylene (PP), and dissimilar substrates, such as polyamides, ethylene-vinyl alcohol (EVOH) copolymers and metals, and multi-layer constructions of these materials is well known. While numerous acid and acid derivative tie-layer resins are known, new adhesive compositions are always in demand to meet the requirements of new polyolefin laminate applications.

Tie-layer adhesives useful for high-stress/high-demand applications are particularly desirable. Such high-stress/high-demand conditions may occur as a result of the processing or manufacturing operation or the environment to which the finished article will be exposed.

In thermoforming, blow molding and film blowing operations, the adhesive may be exposed to high temperature, high shear and other detrimental process conditions. For example, when blow molding large articles such as multi-layer thermoplastic gas tanks, the parisons may be suspended at elevated temperatures for extended periods before mold closure and blowing thus creating significant stresses and placing extraordinary demands on the adhesives being used. Similarly, in various post-processing procedures the adhesive may be exposed to irradiation or other stresses, such as the stresses encountered during orientation using double-bubble or tenter frame processes. Any deterioration of the adhesive during processing or post-processing results in a corresponding reduction in adhesive strength in the finished product which can reduce service life and result in premature failure.

As indicated above, in numerous end-use applications the finished articles containing tie-layer adhesives are subjected to high-stress/high-demand conditions. One such application is multi-layer tubing used for under-the-hood automotive applications, such as for fuel lines. These lines can be exposed to high temperatures for extended periods and an adhesive composition resistant to thermal degradation is therefore essential. Other applications where heat-resistant tie-layer adhesives are beneficial are for heat shrinkable multi-layer films and films used for cook-in applications.

Another such end-use application where composite structures utilizing tie-layers must withstand the repeated stresses of temperature and pressure is for composite polyolefin/metal pipe and tubing for plumbing applications and heating systems. Crosslinked PE (PEX) and aluminum are most commonly used for these applications, but copper and conventional PE are also utilized by some manufacturers. These constructions would have the structure PEX/tie-layer/metal/tie-layer/PEX or PE/tie-layer/metal/tie-layer/PE. Even though the metal provides most of the mechanical strength in these constructions, mechanical integrity and pressure ratings are dependent on the quality of the bond between the metal and PE.

Failure of the PE or PEX to metal bond results in delamination, which usually takes the form of blister formation at the inner metal/tie-layer interface and severely detracts from the service life of the pipe. While various theories have been advanced as to how the blisters are formed, most agree that the thermal shocks associated with repeated heating and cooling play a major role. In fact, thermal cycle tests such as those defined in ASTM F-1281-97 and F-1282-97, DVGW W542 (Deutscher Verein das Gasund Wasserfaches) and KIWA BRL-K536/03 G/98 (Keurings Instituut voor Waterleiding Artikelen) are used to evaluate coextruded PE or PEX composite pressure pipe having a welded aluminum tube reinforcement between the inner and outer layers.

SUMMARY OF THE INVENTION

This invention relates to improved adhesives suitable for use in lamination, extrusion and coextrusion processes and particularly for applications involving high-stress/high-demand processing or post-processing conditions. The adhesives comprise a base resin having a network structure, a modified polyolefin containing acid or acid derivative finctionality and, optionally, an elastomeric homopolymer or copolymer. More specifically, the adhesives are comprised of (a) 35 to 95 weight percent, based on the total weight of the adhesive, in-situ prepared ethylene/$C_{4-8}$ alpha-olefin copolymer resin, preferably an ethylene-hexene-1 copolymer, having a density of 0.930 g/cc or below, and (b) 5 to 65 weight percent, based on the total weight of the adhesive, of a grafted polyolefin. When an elastomer is included, it will comprise 7 to 35 weight percent, based on the total weight of the adhesive, elastomeric homopolymer or copolymer which is typically an ethylene-propylene copolymer or terpolymer. The network structure of the base resin is evidenced by unique rheological behavior upon low shear modification or solution dissolution, that is, the base resin copolymers, when in pelletized form, exhibit a reduction in melt elasticity (ER) of 10 percent or more to a final ER value of 1.0 or less upon rheometric low shear modification or solution dissolution. Preferably, the base resin copolymer contains 20 percent or less by weight of the $C_{4-8}$ alpha-olefin. The modified polyolefin is preferably an ethylene homopolymer or copolymer grafted with ethylenically unsaturated carboxylic acid or carboxylic acid derivative and, most preferably, an HDPE or LDPE resin grafted with maleic anhydride. Elastomeric homopolymers or copolymers which can be used are preferably ethylene-propylene rubbers or ethylene-propylene-diene rubbers containing 50 percent or more by weight ethylene. The adhesives have melt indexes in the range 0.1 to 20 g/10 min.

There are also provided composite structures comprising a substrate having the above-defined adhesives adhered thereto. The substrates include metal, paper, plastic, glass and composite materials. Other composite structures having two or more of the same or different substrates with adjacent substrate pairs adhered together with an intervening layer of adhesive are also provided. Particularly useful composite structures of these types comprise polyethylene or crosslinked polyethylene and metals, such as aluminum, and polyethylene or crosslinked polyethylene and barrier resins selected from the group consisting of EVOH, polyamide and polyester. Specific composites incorporating structures of the above-types and with the adhesive of the invention include polyethylene/adhesive/metal/adhesive/polyethylene wherein the polyethylene can be crosslinked or uncrosslinked and the metal is preferably aluminum. Such structures are utilized for the construction of composite pipes used for heating and plumbing applications.

DETAILED DESCRIPTION

The present invention provides adhesives useful for a variety of applications, but is particularly well suited for adhering polyolefins to metal substrates, said adhesives containing about 35 to 95 weight percent of an ethylene copolymer base resin which has a network structure so that, when in pelletized form, it exhibits a reduction in melt elasticity of 10% or more to a final ER value of 1.0 or less upon rheometric low shear modification or solution dissolution and 5 to 65 weight percent modified polyolefin containing acid or acid derivative functionality. Optionally and in a preferred embodiment, 10 to 40 weight percent of an elastomeric homopolymer or copolymer component will be included. The acid or acid derivative content of the adhesive is generally about 0.05 to 2.0 weight percent and, more preferably, 0.1 to 1.0 weight percent. All weight percentages of the adhesive components are based on the total weight of the adhesive composition.

Adhesives of the above type provide excellent adhesion for high-stress/high-demand application. One particularly useful application is to adhere polyolefin substrates and metals, particularly aluminum and copper. They are even more advantageously employed for the construction of polyolefin/metal composite pressure pipe for potable water applications and heating systems which undergo repeated thermal cycles. Composite polyolefin/metal pipes produced using the improved adhesives of the invention exhibit enhanced resistance to delamination at the metal-polyolefin interface.

The base resin, which can constitute a minor proportion of the adhesive but most typically comprises the major component, is a copolymer of ethylene with at least one other $C_{4-8}$ alpha-olefin comonomer. The comonomer comprises less than 10 weight percent of the copolymer and, more typically, less than 5 weight percent. In a particularly useful embodiment of the invention, the comonomer is hexene-1.

Densities of useful ethylene copolymer base resins are 0.930 g/cc or below. More typically, the density of the ethylene copolymer is 0.920 g/cc or below and, most preferably, 0.917 g/cc or below. Ethylene copolymer resins within the recited density ranges are identified within the industry as linear low density polyethylene (LLDPE). The ethylene copolymers have melt indexes (MI) of 0.01 g/10 min or above measured at 190° C. in accordance with ASTM D-1238, Condition E. More preferably, MIs of the base resins will range from about 0.1 to 5.0 g/10 min and, most preferably, from 0.5 to 4.0 g/10 min.

The ethylene copolymer base resins useful for the invention have a network structure believed to be formed, at least in part, by association of hard and soft phases present in the resin. The soft rubber phase is characterized as being an ethylene/comonomer rubber which is highly branched, i.e., contains from about 35 to 65 alkyl branches per 1000 total carbon atoms. The hard phase is ethylene homopolymer or copolymer with low branching content, i.e., alkyl branch contents per 1000 total carbon atoms less than 35. As a result of the formation of the network structure, the base resins have unusual and unexpected melt elastic properties. Ethylene copolymers having a network structure and the processes by which they are characterized and prepared are described in detail in copending application Ser. No. 09/205,481 filed Dec. 4, 1998, which is incorporated herein in its entirety by reference thereto.

The amount of rubber phase in the ethylene copolymer is typically about 15 volume percent or greater as measured by Scanning Electron Microscopy (SEM). This technique involves treating a compression molded sample to remove any rubbery, amorphous or low crystallinity polymer from the specimen surface to leave definable cavities which are then statistically analyzed by photomicrography. The technique for SEM determinations of rubber-phase content is described in an article by F. Mirabella, et al., entitled, "Morphological Explanation of the Extraordinary Fracture Toughness of Linear Low Density Polyethylenes," J. Polymer Science: Part B: Polymer Physics, Vol. 26, No. 9, August 1988, pp. 1995–2005. Minor amounts, typically, less than 1000 ppm, conventional polymer additives such as antioxidants, thermal stabilizers, UV adsorbers and the like may be present in the base resin.

The presence of a network structure in the ethylene copolymer resin of the present invention is verified by the fact that the copolymer resin exhibits a reactor-made-to-pellet ER increase which is reversible, i.e., reduced, upon rheometric low shear modification. The term "ER" is used herein to measure the elasticity or the polydispersity of the ethylene copolymer which is derived from rheological data on polymer melts, see the article to Shroff, et al., entitled "New Measures of Polydispersity from Rheological Data on Polymer Melts," J. Applied Polymer Science, Vol. 57, pp. 1605–1626 (1995). The term "reactor-made" is used herein to denote powder, slurry or solution forms of the polymer resin which are formed in a polymerization vessel prior to melt processing.

In addition to exhibiting the above melt elastic behavior, the pelletized form of the ethylene copolymer of the present invention exhibits a decrease in melt elasticity when dissolved in an organic solvent such as xylene. The solution dissolution ER value is nearly the same as that of the original reactor-made material. The term "solution dissolution" is used herein to indicate that the pelletized form of the ethylene copolymer resin can be dissolved in an organic solvent such as xylene. The importance of this technique is that it allows a means for estimating the ER value of the original reactor-made material if the same is not available.

As a result of the network structure created by the interaction of the hard and soft phases, the present copolymers exhibit unusual melts elastic behavior and improved resin properties. For example, blown and cast films produced with these resins exhibit high impact strength. It is believed that these features, at least in part, to contribute to the improved results obtained with the present adhesives.

ER values are calculated from Theological data generated by measuring dynamic rheology in the frequency sweep mode, as described in ASTM 4440-95a. A Rheometrics ARES rheometer was used, operating at 150° C., in the parallel plate mode in a nitrogen environment (in order to minimize sample oxidation/degradation). The gap in the parallel plate geometry was typically 1.2–1.4 mm and the strain amplitude was 10–20%. Preferably 10% strain amplitude was employed. The range of frequencies was 0.0251 to 398.1 rad/sec.

As disclosed in an article by Shroff, et al., supra, and U.S. Pat. No. 5,534,472 (See Column 10, lines 20–30), ER is calculated from the storage modulus (G') and loss modulus (G") data, as follows: the nine lowest frequency points are used (5 points per frequency decade) and a linear equation is fitted by least-squares regression to log G' versus log G". ER is then calculated form the following equation:

$$ER = (1.781 \times 10^{-3}) \times G', \text{ at a value of } G" = 5000 \text{ dyn/cm}^2.$$

It is understood by those skilled in the art that nonlinearity in the log G' versus log G" plot will result in different ER values depending on the range of the data employed, which in turns relates to the range in frequency data. The procedure followed was to extend the lower end of the frequency range so that the lowermost G" value was within the range of $7 \times 10^3 - 10^4$ dyn/cm$^2$. Practically speaking, this requires a lowermost frequency of 0.0398 rad/sec for 1 MI LLDPEs and 0.0251 rad/sec for 0.6 MI LLDPEs, at The above-described ethylene copolymers are prepared in-situ, i.e., they are reactor made products, by polymerizing ethylene and at least one $C_{4-8}$ alpha-olefin in the presence of a polymerization catalyst, a cocatalyst and an optional cocatalyst modifier under ethylene polymerization conditions. Polymerization details are provided in previously referenced and incorporated copending application Ser. No. 09/205,481.

The second component is a modified polyolefin containing acid or acid derivative functionality. Modified polyolefins of this type are known and, most commonly, are grafted polyethylenes obtained by reacting unsaturated carboxylic acids and carboxylic acid anhydrides, or derivatives thereof, with polyethylene under grafting conditions. The grafting monomers, i.e., acid, anhydride or derivative, are incorporated along the polyethylene backbone.

The term polyethylene as used herein includes ethylene homopolymer resins and copolymer resins of ethylene with propylene, butene, hexene and octene. These homopolymer and copolymer resins are obtained utilizing known polymerization technologies including metallocene and single-site polymerization processes. It also encompasses mixtures of two or more homopolymers or copolymers of the above types. In a particularly useful embodiment of the invention, the grafted polyolefin is a high density polyethylene (HDPE) or LLDPE. Useful HDPEs have densities of 0.94 g/cc and above and LLDPEs have densities up to 0.939 g/cc.

Carboxylic acids or anhydrides useful as grafting monomers include compounds such as acrylic acid, maleic acid, fimaric acid, citraconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride 2-oxa-1,3-diketospiro(4,4)non-7-ene, bicyclo(2.2.1)hept-5-ene-2,3-dicarboxylic acid or anhydride, tetrahydropthhalic acid or anhydride, x-methylbicyclo(2.2.1)hept-5-ene-2,3-dicarboxylic acid or anhydride, NADIC anhydride, methyl NADIC anhydride, HIMIC anhydride, and methyl HIMIC anhydride. Maleic anhydride is a particularly useful grafting monomer. Acid and anhydride derivatives which can be used to graft the polyethylene include dialkyl maleates, dialkyl fumarates, dialkyl itaconates, dialkyl mesaconates, dialkyl citraconates and alkyl crotonates. It is often desirable to use more than one grafting monomer in order to control the physical properties of the modified polyolefin product.

Grafting is accomplished in accordance with known procedures, generally by heating a mixture of the polyolefin and graft monomer(s) with or without a solvent. Most typically, the grafted products are prepared by melt blending the polyethylene in the substantial absence of a solvent, with a free radical generating catalyst, such as an organic peroxide, in the presence of the grafting monomer in a shear-imparting reactor, such as an extruder. Twin screw extruders such as those marketed by Werner-Pfleiderer under the designations ZSK-53 and ZSK-83 are especially useful for carrying out the grafting operation.

The amount of acid or acid derivative comonomer(s) grafted onto the polyolefin can range from about 0.1 to about 4 weight percent. In a preferred embodiment of the invention when maleic anhydride is grafted onto HDPE or LLDPE, the grafted maleic anhydride concentration is preferably 0.5 to 4 weight percent. Melt indexes of the grafted polyethylenes, as determined by ASTM D-1238, Condition E is most generally in the range 1 to 20 g/10 min. In another particularly useful embodiment the graft comonomer, preferably maleic anhydride, constitutes 0.5 to 3.0 weight percent of the modified polyolefin composition.

An elastomeric homopolymer or copolymer is optionally included with the base resin and modified polyolefin to produce the adhesive blends. Elastomers used for this purpose must be compatible with the base resin and modified polyolefin. Incompatibility will result in poor processability and phase segregation during extrusion, i.e., melt fracture. Elastomeric copolymers of ethylene and particularly copolymers wherein ethylene is the predominant monomer are therefore especially useful for this purpose.

Ethylene-propylene rubbers (EPR) and ethylene-propylene-diene rubbers (EPDM) are particularly advantageous elastomeric components for the compositions of the invention. These elastomers typically contain greater than 50 weight percent ethylene and, in one highly useful embodiment of the invention, an EPR or EPDM containing 60 percent or more ethylene is utilized. Products of this type are obtained by conventional polymerization procedures known to the art and include the so-called metallocene rubbers. As used herein, the term "elastomer" or "elastomeric" refers to products having rubber-like properties and little or no crystallinity.

Illustrative elastomers of the above type and which are available from commercial sources include BUNA EPT 2070 (22 Mooney ML(1+4)125° C., 69% ethylene), BUNA EPT 2370 (16 Mooney, 3% ethylene norbornene, 72% ethylene), BUNA 2460 (21 Mooney, 4% ethylene norbornene, 62% ethylene), KELTAN EPDM DE244 (Mooney 55, 71% ethylene, 0.2% ethylene norbornene) and ENGAGE 8100 (23 Mooney (ML(1+4)121° C.), or ENGAGE 8200 with 8 Mooney.

In addition to the EPR and EPDM polymers mentioned above, ethylene-ester copolymers having elastomeric character and wherein the ester comonomer corresponds to the formula:

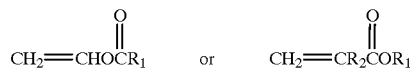

where $R_1$ is an alkyl group and $R_2$ is hydrogen or methyl can also be used when formulating the adhesives. Whereas copolymers of ethylene with vinyl acetate and n-butyl acrylate are especially advantageous, other useful elastomeric copolymers wherein the comonomer is methyl acrylate, methyl methacrylate, vinyl propionate, vinyl butyrate and the like can be employed.

Still other elastomers which are not derived from ethylene may be included in the adhesive blends. Examples of such elastomers include poly(isobutylene), copolymers of isobutylene and isoprene, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

The adhesives are prepared by physically mixing the base resin, modified polyolefin and elastomeric components plus any additional components or additives by any convention means. Mixing in a Banbury mixer or in an extruder are especially convenient. Typically the adhesive blends will contain one or more stabilizing agents, such as antioxidants, thermal stabilizers, UV inhibitors or the like. The type and amount of stabilizer(s) will vary depending on the end use application. One or more conventional resins may also be included, if desired. For example, a higher melt index resin may be added to raise the melt index of the adhesive formulation. These additional ingredients may be added to the mixture of all of the components as they are being melt blended or they may be pre-incorporated into one or more of the components before the final blending operation. Typically, base resin and elastomer obtained from commercial sources will contain some stabilizer; however, in most instances additional stabilizer(s) will be added during blending.

When an elastomer is included, the adhesive will preferably comprise 35 to 85 weight percent base resin, 7 to 22 weight percent modified polyolefin and 7 to 35 weight percent elastomeric polymer.

In one highly useful embodiment of the invention, the base resin is an LLDPE having hexene-1 as the comonomer, the modified polyolefin is maleic anhydride grafted HDPE and the elastomer is EPR or EPDM. In an even more preferred embodiment the LLDPE constitutes 45 to 75 weight percent of the adhesive, the maleic anhydride functionalized HDPE comprises 10 to 20 weight percent of the adhesive and the EPR or EPDM is present from 10 to 30 weight percent, based on the total weight of the adhesive. Adhesive compositions of the invention will generally have melt indexes in the range 0.1 to 20 g/10 min and, more preferably, in the range 0.5 to 10 g/10 min. Adhesives within these melt index ranges are readily extrudable using conventional extrusion procedures and can be used for a variety of applications.

The improved compositions of the invention are suitable for adhering a variety of substrates including metals, paper, plastics, glass and composite materials. They are particularly useful as tie-layers for bonding one or more polyolefin, ionomer, polyester, polyamide, ethylene-vinyl alcohol copolymer and metal layers in multi-layer constructions. The adhesives can be used in lamination, extrusion and coextrusion processes, e.g., blown or cast film extrusion/coextrusion, sheet extrusion/coextrusion, extrusion/coextrusion lamination, extrusion/coextrusion coating, injection blow molding, melt thermoforming and the like.

Polyolefin resins which can be adhered with the compositions of the invention include ethylene and propylene homopolymers and copolymers of ethylene with $C_{3-8}$ alpha-olefins, alkyl (meth)acrylates and vinyl carboxylates. Representative resins of this type include, but are not limited to, LDPE, LLDPE, HDPE, PP, ethylene-vinyl acetate copolymer (EVA), ethylene-methyl acrylate copolymer (EMA) and ethylene-n-butyl acrylate copolymer (EnBA). Polybutylene terephthalate is one example of a useful polyester resin. Useful polyamides can include nylon 6; nylon 6,6; nylon 12; nylon 6,12 and nylon 6,66. EVOH obtained by the saponification/hydrolysis of EVA is also a highly useful resin to impart barrier properties, particularly for film applications. Metals typically employed for multi-layer constructions are primarily sheets and foils of aluminum, copper and steel.

The adhesives of the invention formulated using a base resin having a network structure are particularly advantageous as adhesives or tie layers for multi-layer constructions produced using processes having one or more high-stress/high-demand processing or post-processing steps or where the finished article will be subjected to high-stress/high-demand conditions. One such situation would be multi-layer blown or cast films subjected to post-processing orientation using double-bubble or tenter frame procedures or thermoforming to improve physical properties such as moisture/vapor resistance or tear resistance. Adhesion values must be maintained during the orientation procedure to insure production of a finished product having the requisite physical properties. Another such application where adhesion must be retained during processing is for blow molding gas tanks. Maintaining adhesion strength within the resulting laminate reduces parison sag and results in tanks having improved physical properties. Blown and cast films which are orientated, irradiated or thermally treated to crosslink and heat shrink and sheet products used in thermoforming processes also benefit from use of the tie layer adhesive of the invention having improved high temperature resistance.

End use applications where the manufactured article is exposed to high-stress/high shear conditions can include blow molded bottles which are hot-filled; films, sheets or trays which may be used in hot-filled retort or cook-in applications; and packaging which is e-beam treated or irradiated during food sterilization or the like.

In the simplest form of construction, a substrate which is typically a polymer is coated with a layer of the adhesive on all or a portion of one side of the substrate. Two-layer film constructions of this type can be folded back on themselves and heat-sealed. Useful three-layer constructions where a substrate material is sandwiched between two layers of adhesive or where the adhesive blend is between two similar or dissimilar substrates are also possible.

Numerous other multi-layer structures designed to meet the requirements of various applications are produced by incorporating additional layers of the same or different types. One such four-layer structure would include PEX/adhesive/EVOH/adhesive. Five-layer composites having a central barrier resin layer, such as EVOH, polyamide or polyester, adhered to a polyolefin on both sides using the adhesive and graphically represented as polyolefin/adhesive/barrier resin/adhesive/polyolefin are also common. A specific example would be PEX/adhesive/EVOH/adhesive/HDPE. A specific construction of this type described in U.S. Pat. No. 5,472,754 for pipe or hose would be PEX/adhesive/EVOH(or HDPE)/adbesive/polyamide. In a similar construction, the barrier layer (EVOH) is replaced with a metal, typically aluminum. Composites of this type, for which the adhesive blends of the invention are particularly useful by virtue of their improved performance, are utilized for composite pressure pipe. The most common constructions of this type would include PEX/adhesive/metal/adhesive/PEX, PEX/adhesive/metal/adhesive/HDPE and HDPE/adhesive/metal/adhesive/HDPE.

Yet another application where the tie-layer must retain adhesive strength during processing is in manufacturing procedures for blow molding gas tanks. Maintaining adhesive strength and enhancing regrind compatibilization to reduce parison sag makes it possible to blow mold gas tanks for automotive applications having improved integrity. A specific six-layer construction of this type would include HDPE/regrind/adhesive/EVOH/adhesive/HDPE.

A multi-layer blown or cast film having seven-layers widely used for shrink wrap and pre-form applications would be LLDPE/adhesive/polyamide/EVOH/polyamide/adhesive/sealant wherein the sealant can be an ionomer, EVA copolymer or metallocene resin or mixture of metallocene resins.

In a particularly useful embodiment, the adhesives are utilized as the tie layer(s) for polyolefin/metal composite pipes. These are multi-layer constructions, most typically, five-layer composites generally represented polyolefin/adhesive/metal/adhesive/polyolefin. Pipe constructions of this type are used for a wide variety of heating and plumbing applications including, for example, hot and cold potable water installations, radiant floor heating systems, snow and ice melting systems for walks and driveways, compressed air supply lines, radiator connections and industrial and sanitary applications.

For most composite pressure pipe constructions, the metal is aluminum and the polyolefin is polyethylene. A specific five-layer construction of the above type would be polyethylene/adhesive/aluminum/adhesive/polyethylene. While it is not necessary, the polyethylene may be crosslinked, utilizing known technology such as thermal, moisture or irradiated cure processes, to enhance physical properties—particularly high temperature and high pressure resistance. Constructions of this type would be represented PEX/adhesive/aluminum/adhesive/PEX. The PEX can be crosslinked using any of the conventional crosslinking technologies used for this purpose and designated within the industry as PEX-a, PEX-b, PEX-c or PEX-d. Composite pressure pipes of the above types are commercially available, in different sizes and designated for different uses, under the tradenames UNIPIPE, AQUAPEX, ALUPEX, MEPLA, ALPEXTHERM, KITEC and MULTY-GOL.

While material and manufacturing technology have improved significantly in recent years, composite polyolefin/metal pressure pipe can experience delamination of the layers. Use of an adhesive or tie-layer between substrate layers improves resistance to delamination, thus improving the mechanical integrity of the composite pipe. Delamination maybe initiated at a manufacturing defect such as gel, dirt, or other foreign contamination, scratches, pits, or other defects in the metal substrate, or near joints where compression or screw type fittings compress the composite pipe. Also welded regions can contain inherent defects such as in the heat affect zone, in the bare space of overlap welds, or adjacent spaces of certain butt welds, such as TIG welds. Delamination may initially be evidenced by formation of a small blister, which can grow and agglomerate decreasing the effectiveness of the composite. Due to defects in the manufacturing process, there may be inherent blister initiation sites caused by thin layers or complete lack of adhesive in certain regions of the composite pipe. The high-stress/high-demand expansion and contraction of usage, e.g., repeated thermal shocks caused by cycling cold and hot liquids through the pipes, contributes to interfacial stress and is believed to contribute to blister growth. Thus, the ability of the adhesives of the invention to withstand these stresses makes them particularly useftil to extend the service life of composite pressure pipe constructions.

In addition to the aforementioned uses, adhesive blends formulated in accordance with the invention may be advantageously used as coatings, for example, such as to coat compressed metal gas pipelines. They can also be utilized for wire and cable applications, e.g., as jacketing materials for high voltage wire and cable products and as insulation for automotive under-hood applications, where exposure to high temperatures and/or repeated hot-cold temperature cycles are encountered.

EXAMPLE I

Preparation of Adhesives:

Two adhesives were prepared in accordance with the invention utilizing different base resins. The base resins used for both blends were LLDPE ethylene-hexene-1 copolymers having network structures and the compositions were as follows:

61 weight percent LLDPE base resin
14 weight percent modified polyolefin
25 weight percent elastomer For the first formulation (identified as Adhesive IA) the base resin had a hexene-1 content of about 11 weight percent, MI of 0.7 g/10 min and density of 0.916 g/cc. The resin had a network structure as evidenced by its ability to undergo a reduction in melt elasticity (ER) of greater than 10 percent upon rheometric low shear modification. Upon low shear modification of the pelletized resin, the ER was reduced from 1.1 to 0.8—a 27 percent decrease. The base resin used for Adhesive IB also contained about 11 weight percent hexene-1 but had a MI of 1.0 g/10 and density of 0.917 g/cc. This resin also had a reactor-made-to-pellet ER increase which is reversible evidencing the presence of a network structure. A 30 percent reduction in ER was observed, from 1.1 to 0.77, when the resin pellets were subjected to rheometric low shear modification in accordance with the prescribed procedures. The modified polyolefin and elastomer used for both adhesive formulations were the same. The modified polyolefin was HDPE (MI 10 g/10 density 0.950 g/cc) grafted with 2.0 weight percent maleic anhydride. The elastomer was a commercially available ethylene-propylene copolymer (Buna EPM copolymer EPT 2070) containing 69 weight percent ethylene and having a 22 Mooney viscosity (ML(1+4)125° C.)).

To prepare the adhesive formulation, the base resin, modified polyolefin and elastomer were dry blended and fed to a Brabender twin screw extruder (Model 23-50-00) with 33 cm conical venting twin screws (L/D 20) operating at 80 rpm. The temperature profile was 180° C. (Zone 1), 200° C. (Zone 2) and 205° C. (Zones 3 and 4). The product was extrudated through a 3.2 mm pelletizing die and strand cut to obtain the pelletized product.

Cast film (0.13 mm) was produced from each of the adhesives using a Brabender 19 mm single screw extruder equipped with a 15.2 cm flat die (L/D 28:1, screw speed 30 rpm, temperature profile: 175° C. (Zone 1), 185° C.(Zone 2) and 210C (Zones 3 and 4)).

Adhesion Testing:

To demonstrate the superior adhesion of the above-prepared adhesive blends of the invention, the cast films obtained using IA and IB were compression molded between two sheets of (0.2 mm thick) pipe grade aluminum. The Al/adhesive/Al sandwich having a final thickness of 0.5 mm was then placed in a 13 cm ×13 cm picture frame mold and, after preheating for 5 minutes (no pressure), compression molded for 1 minute at 2750 bar. Ten (10) mm wide strips were cut from the laminate and wrapped around a mandrel to simulate pipe and pulled at a rate of 50 mm/min in accordance with the DIN 53 357 Roll Test. A minimum of three (3) specimens were tested and the values reported are the average of all pulls. For peel tests conducted at elevated temperatures, the grips and specimen are inside an oven and heated to the desired temperature for a minimum of 30 minutes before the pull.

Adhesion values, reported in Newtons/centimeter (N/cm), obtained for the specimens prepared using the blends of the invention (IA and IB) at room temperature, (25° C.) and 95° C. are tabulated below along with values obtained with specimens adhered using identical formulations except that the base resin used was an ethylene copolymer not having a network structure as defined herein. The percentage increase or decrease in adhesion obtained at 95° C.is also provided. LLDPE copolymers used for all of the comparative blends (identified as Comparatives A–E) were pelletized commercial resins having comparable MIs and densities to the base resin used for IA and IB but without the network structure. Comparative A utilized MOBIL NTX 095 LLDPE (0.9 g/10 min MI; density 0.917 g/cc; ER 0.65). Comparative B was formulated using TUFLIN ST 2001 (0.8 g/10 MI; density 0.917 g/cc; ER 0.7). NOVAPOL TDF 9022 (0.9 MI; density 0.917 g/cc; ER 0.7) was used to prepare Comparative C. All of the LLDPE resins utilized for Comparative blends A–C were ethylene-hexene-1 copolymers generally referred to within the industry as "super-hexene" resins; however, none of the resins exhibited any ER reduction upon rheometric low shear modification. A 1.0 MI metallocene ethylene-hexene-1 copolymer resin, EXCEED 350D60, was used to prepare Comparative D. The metallocene resin does not exhibit an ER reduction upon rheometric low shear modification. Comparative E was prepared using PETROTHENE GA601 LLDPE, a conventional 1 MI film grade resin (density 0.918 g/cc; ER 0.83) which exhibited zero low shear modification.

| Adhesive Blend | Peel Force (N/cm) | | Percent Change |
| --- | --- | --- | --- |
| | 25° C. | 95° C. | |
| IA | 81.5 | 108.9 | +32 |
| IB | 115.3 | 92.7 | −20 |
| Comparative A | 87.3 | 44.5 | −46 |
| Comparative B | 72.9 | 44.1 | −39 |
| Comparative C | 84.5 | 48.8 | −42 |
| Comparative D | 88.8 | 42.7 | −52 |
| Comparative E | 74.3 | 43.6 | −41 |

It is apparent from the above data that peel strengths obtained with Adhesives IA and IB of the invention prepared using the base resins having a network structure, are significantly higher at the elevated temperature (95° C.) compared to results for the comparative examples utilizing adhesives formulated using base resins not having a network structure. Furthermore, Adhesive IA showed a significant increase in the peel strength at the higher temperature. With all of the comparative blends, there was a reduction in adhesion ranging from 39 to 80 percent at 95° C. Even though adhesive IB also exhibited reduced adhesion at 95° C., the amount of reduction was significantly less than obtained with the comparative examples and the adhesion value at 95° C. was still nearly twice that of the best comparative example. Maintaining adhesion values at elevated temperatures is important in applications such as with composite pressure pipes used to transport hot water.

EXAMPLE II

To demonstrate the ability of the adhesives of the invention to be used with other substrates, ethylene-vinyl alcohol (EVOH) barrier film was heat-sealed using Adhesive IA. For this test, a single layer of the 0.13 mm cast film of Adhesive IA was sandwiched between two layers of 0.13 mm EVOH film and heat-sealed at 163° C. for 3 seconds at 2.8 bar. The EVOH film was produced using a commercially available EVOH copolymer (SOARNOL DC3203) having an ethylene content of 32 mole percent. The heat-sealed 3-layer laminates were evaluated for adhesion strength at room temperature at 95° C. in accordance with ISO 11339. The peel strength at room temperature was 12.4 N/cm. At 95° C. a peel value of 10.2 N/cm was obtained—a reduction in peel strength of less than 20 percent compared to the room temperature value.

EXAMPLE III

To further demonstrate the utility of the improved adhesives of the invention, Adhesive 1B was prepared using the reactor powder (as opposed to the pelletized resin) and used as the tie-layer, i.e., adhesive layer between the metal and polyoelfin layers, for composite pressure pipe constructions. The multi-layer PEX/adhesive/Al pipe/adhesive/PEX constructions having a wall thickness of 2 mm and outside diameter of 16 mm were produced on a commercial KITEC continuous pipe production line wherein the thermoplastic resin and the adhesive are coextruded onto the inside and outside of 0.2 mm thick Al pipe which is preformed and welded longitudinally in an overlapping way just prior to application of the polyethylene and adhesive layers. The thermoplastic resin used was a conventional crosslinkable ethylene-silane copolymer containing a crosslinking agent (PEX-b). Specimens were cut from the pipe and tested for adhesion of the inner PEX layer to the Al in accordance with DIN 53 357. Results of these tests conducted at 25° C. and 95° C. follow:

| Temperature (° C.) | Peel Strength (N/cm) |
| --- | --- |
| 25 | 50.6 |
| 95 | 47.1 |

While there was a 7 percent reduction in peel strength at the higher temperature, the reduction is less than would be expected with any of the comparative formulations A–E utilizing a base resin not having a network structure.

EXAMPLE IV

To demonstrate the ability to utilize the adhesive blends for the production of composite sheet of the type used to thermoform cups and trays for food packaging applications, 5-layer sheet was produced on a WELEX sheet line utilizing HDPE, (MI 2.1 g/10 min; density 0.945 g/cc), EVOH (EVAL F101A:33 mole percent ethylene) and Adhesive IA. The sheet having a total thickness of 1.1 mm was comprised as follows:

| HDPE | 0.5 mm |
| --- | --- |
| Adhesive | 0.03 mm |
| EVOH | 0.05 mm |
| Adhesive | 0.03 mm |
| HDPE | 0.5 mm |

The line speed of 1 m/min and feed block temperature of 212° C./205° C. Die temperatures were 205° C. and chill rolls were maintained at 180° C., 190° C. and 180° C. The resulting sheet, tested in accordance with ISO 11339 utilizing a 12.5 mm strip pulled at a rate of 25 cm/min had a peel strength of 11.4 N at 95° C.

I claim:
1. An adhesive comprising:
   (a) 35 to 95 weight percent, based on the total weight of the adhesive, an ethylene copolymer resin of density

0.930 g/cc or below having hard and soft phases that form a network structure; and (b) 5 to 65 weight percent, based on the total weight of the adhesive, of a modified polyolefin containing acid or acid derivative functionality.

2. The adhesive of claim 1 having a melt index in the range 0.1 to 20 g/10 min.

3. The adhesive of claim 1 wherein (a) is a copolymer of ethylene and a $C_{4-8}$ alpha-olefin, said alpha-olefin comprising less than 20 percent by weight of the copolymer composition, and (b) is an ethylene homopolymer or copolymer grafted with an ethylenically unsaturated carboxylic acid or carboxylic acid derivative.

4. The adhesive of claim 3 additionally containing 7 to 35 weight percent, based on the total weight of the adhesive, of an elastomeric homopolymer or copolymer.

5. The adhesive of claim 4 wherein (a) constitutes from 35 to 85 weight percent of the adhesive, (b) constitutes from 7 to 22 weight percent of the adhesive and the elastomeric homopolymer or copolymer is an ethylene-propylene copolymer or terpolymer.

6. The adhesive of claim 5 wherein the elastomeric homopolymer or copolymer constitutes 10 to 30 weight percent of the adhesive and contains greater than 50 weight percent ethylene.

7. The adhesive of claim 6 having a melt index in the range 0.5 to 10 g/10 min.

8. The adhesive of claim 3 wherein (a) is an in-situ prepared ethylene copolymer resin which, when in the pelletized form, exhibits a reduction in ER of 10 percent or more to a final ER value of 1.0 or less upon rheometric low sheer modification or solution dissolution.

9. The adhesive of claim 8 wherein (b) is HDPE or LLDPE grafted with maleic anhydride.

10. The adhesive of claim 9 wherein (a) is a copolymer of ethylene and hexene-1 and (b) is grafted with 0.5 to 4 weight percent maleic anhydride.

11. The adhesive of claim 10 wherein (a) constitutes from 35 to 85 weight percent of the adhesive, (b) constitutes 7 to 22 weight percent of the adhesive and additionally containing 7 to 35 weight percent, based on the total weight of the adhesive, of an elastomeric ethylene-propylene copolymer or terpolymer.

12. The adhesive of claim 1 having a melt index in the range 0.1 to 20 g/10 min and wherein (a) is an in-situ prepared ethylene-hexene-1 copolymer having a density of 0.920 or below and melt index of 0.5 to 4.0 g/10 min and which, when in the pelletized form, exhibits a reduction in ER of 10 percent or more to a final ER value of 1.0 or less upon rheometric low sheer modification or solution dissolution; (b) is HDPE grafted with 0.5 to 4 weight percent of a maleic anhydride and having a melt index of 1 to 20 g/10 min; and 7 to 35 weight percent, based on the total weight of the adhesive, ethylene-propylene rubber or ethylene-propylene-diene rubber wherein the ethylene content is greater than 50 weight percent.

13. The adhesive of claim 12 wherein the melt index is from 0.5 to 10 g/10 min and containing 35 to 85 weight percent (a), 7 to 22 weight percent (b) and 10 to 30 weight percent ethylene-propylene rubber or ethylene-propylene-diene rubber having 60 percent or more ethylene.

14. A composite structure comprising:
(i) a substrate, and adhered thereto
(ii) an adhesive having a melt index in the range of 0.1 to 20 g/10 min comprising:
(a) 35 to 95 weight percent, based on the total weight of the adhesive, an ethylene copolymer resin of density 0.930 g/cc or below having hard and soft phases that form a network structure; and
(b) 5 to 65 weight percent, based on the total weight of the adhesive, of a modified polyolefin containing acid or acid derivative functionality.

15. The composite structure of claim 14 wherein (i) is selected from the group consisting of metal, paper, plastic, glass and composite materials and (ii) is an adhesive wherein (a) is an in-situ prepared copolymer of ethylene and a $C_{4-8}$ alpha-olefin which, when in the pelletized form, exhibits a reduction in ER of 10 percent or more to a final ER value of 1.0 or less upon rheometric low sheer modification or solution dissolution and (b) is an ethylene homopolymer or copolymer grafted with 0.5 to 4 weight percent maleic anhydride.

16. The composite structure of claim 15 produced by lamination, extrusion or coextrusion processes.

17. The composite structure of claim 15 wherein (ii) additionally contains 7 to 35 weight percent, based on the total weight of the adhesive, ethylene-propylene rubber or ethylene-propylene-diene rubber wherein the ethylene content is greater than 50 weight percent.

18. The composite structure of claim 15 wherein the substrate is aluminum.

19. The composite structure of claim 15 wherein the substrate is polyethylene.

20. The composite structure of claim 15 wherein the substrate is crosslinked polyethylene.

21. The composite structure of claim 15 wherein the substrate is a barrier resin selected from the group consisting of EVOH, polyamide and polyester.

22. A composite structure comprising:
(i) two or more substrates selected from the group consisting of metal, paper, plastic, glass and composite materials and having adjacent pairs adhered together by
(ii) an intervening layer of an adhesive having a melt index in the range of 0.1 to 20 g/10 min comprising:
(a) 35 to 95 weight percent, based on the total weight of the adhesive, an ethylene copolymer resin of density 0.930 g/cc or below having hard and soft phases that form a network structure; and
(b) 5 to 65 weight percent, based on the total weight of the adhesive, of a modified polyolefin containing acid or acid derivative functionality.

23. The composite structure of claim 22 wherein (ii) is an adhesive wherein (a) is an in-situ prepared copolymer of ethylene and a $C_{4-8}$ alpha-olefin which, when in the pelletized form, exhibits a reduction in ER of 10 percent or more to a final ER value of 1.0 or less upon rheometric low sheer modification or solution dissolution and (b) is an ethylene homopolymer or copolymer grafted with 0.5 to 4 weight percent maleic anhydride.

24. The composite structure of claim 23 produced by lamination, extrusion or coextrusion processes.

25. The composite structure of claim 23 wherein (ii) additionally contains contains 7 to 35 weight percent, based on the total weight of the adhesive, ethylene-propylene rubber or ethylene-propylene-diene rubber having an ethylene content is greater than 50 weight percent.

26. The composite structure of claim 25 wherein (i) comprises polyethylene and metal.

27. The composite structure of claim 25 wherein (i) comprises crosslinked polyethylene and metal.

28. The composite structure of claim 25 wherein (i) comprises polyethylene and a barrier resin selected from the group consisting of EVOH, polyamide and polyester.

29. The composite structure of claim 25 wherein (i) comprises crosslinked polyethylene and a barrier resin selected from the group consisting of EVOH, polyamide and polyester.

30. The composite structure of claim 26 wherein the metal is aluminum.

31. The composite structure of claim 30 wherein the structure comprises polyethylene/adhesive/aluminum/adhesive/polyethylene.

32. The composite structure of claim 31 adapted as a coextruded pipe.

33. The composite structure of claim 27 wherein the metal is aluminum.

34. The composite structure of claim 33 wherein the structure comprises crosslinked polyethylene/adhesive/aluminum/adhesive/crosslinked polyethylene.

35. The composite structure of claim 34 adapted as a coextruded pipe.

* * * * *